US010809741B2

United States Patent
Hille et al.

(10) Patent No.: US 10,809,741 B2
(45) Date of Patent: Oct. 20, 2020

(54) METHOD AND SYSTEM FOR CONTROLLING THE SPEED OF A VEHICLE

(71) Applicant: Polaris Industries Inc., Medina, MN (US)

(72) Inventors: David G. Hille, Brush Prairie, WA (US); Chun Lan, Plymouth, MN (US); Scott D. Taylor, Blaine, MN (US); Joseph B. Bottensek, St. Louis Park, MN (US); Jacob D. Scherer, Clear Lake, MN (US); Duane D. Wagner, Stillwater, MN (US); Jacob J. Minick, St. Paul, MN (US)

(73) Assignee: Polaris Industries Inc., Medina, MN (US)

( * ) Notice: Subject to any disclaimer, the term of this patent is extended or adjusted under 35 U.S.C. 154(b) by 377 days.

(21) Appl. No.: 15/816,118

(22) Filed: Nov. 17, 2017

(65) Prior Publication Data

US 2019/0155307 A1 May 23, 2019

(51) Int. Cl.
 *G05D 1/02* (2020.01)
 *B60W 30/18* (2012.01)
 *B60W 30/14* (2006.01)
 *G01S 19/52* (2010.01)
 (Continued)

(52) U.S. Cl.
 CPC ......... *G05D 1/0278* (2013.01); *B60W 30/146* (2013.01); *B60W 30/18072* (2013.01); *B60W 30/18109* (2013.01); *B60W 30/18127* (2013.01); *G01S 19/52* (2013.01); *B60W 10/06* (2013.01); *B60W 10/18* (2013.01);
 (Continued)

(58) Field of Classification Search
 USPC .......................................................... 701/93
 See application file for complete search history.

(56) References Cited

U.S. PATENT DOCUMENTS

| 2,780,300 A | 2/1957 | Beyer |
| 7,084,735 B2 | 8/2006 | Kapolka |
| 7,315,779 B1 | 1/2008 | Rioux et al. |

(Continued)

FOREIGN PATENT DOCUMENTS

| CN | 103359053 B | 1/2016 |
| DE | 102012025036 A1 | 6/2014 |

(Continued)

OTHER PUBLICATIONS

International Search Report and Written Opinion for corresponding PCT Application PCT/US2018/061045.

*Primary Examiner* — Tyler D Paige
(74) *Attorney, Agent, or Firm* — Harness Dickey

(57) ABSTRACT

A system for regulating the speed of a vehicle includes defining a first border for a first geographic region. The border has a first speed within the border and a second speed outside of the border. The system includes determining a first velocity of the vehicle including a vehicle speed and direction of the vehicle approaching the border. The difference between the vehicle speed and the second speed is the calculated, as is a distance between the vehicle and the border. If the difference between the vehicle speed and the second speed divided by the distance is greater than a predetermined value, the vehicle is decelerated at a rate so that the vehicle will have a second speed when the vehicle reaches the border.

20 Claims, 7 Drawing Sheets

(51) Int. Cl.
*B60W 10/06* (2006.01)
*B60W 10/18* (2012.01)
(52) U.S. Cl.
CPC ..... *B60W 2556/50* (2020.02); *B60W 2556/60* (2020.02); *B60W 2720/10* (2013.01); *B60W 2720/106* (2013.01)

(56) References Cited

U.S. PATENT DOCUMENTS

| | | | |
|---|---|---|---|
| 7,346,439 | B2 | 3/2008 | Bodin |
| 7,475,746 | B2 | 1/2009 | Tsukada et al. |
| 7,711,468 | B1 * | 5/2010 | Levy ................. B60W 30/143 340/441 |
| 7,940,173 | B2 * | 5/2011 | Koen .................. G06Q 10/06 340/539.13 |
| 8,296,034 | B2 | 10/2012 | Tetsuka et al. |
| 8,548,710 | B1 | 10/2013 | Reisenberger |
| 8,818,570 | B2 | 8/2014 | Johnson et al. |
| 9,162,573 | B2 | 10/2015 | Grajkowski et al. |
| 9,253,200 | B2 | 2/2016 | Schwarz et al. |
| 9,286,264 | B2 | 3/2016 | Johnson et al. |
| 9,316,196 | B2 | 4/2016 | Nishimura et al. |
| 9,557,179 | B2 | 1/2017 | Finlow-Bates |
| 9,588,878 | B2 | 3/2017 | Shiraishi et al. |
| 2005/0216164 | A1 * | 9/2005 | Sakata .................. B60T 8/1755 701/70 |
| 2008/0223646 | A1 | 9/2008 | White et al. |
| 2011/0307155 | A1 * | 12/2011 | Simard .................. F02D 29/02 701/93 |
| 2013/0018567 | A1 | 1/2013 | Lim et al. |
| 2013/0289797 | A1 | 10/2013 | Johnson et al. |
| 2013/0289799 | A1 | 10/2013 | Johnson et al. |
| 2013/0345913 | A1 * | 12/2013 | Krueger .................. B60T 1/10 701/22 |
| 2019/0155307 | A1 * | 5/2019 | Hille .................. B60W 30/146 |

FOREIGN PATENT DOCUMENTS

| | | |
|---|---|---|
| EP | 2116984 A1 | 11/2009 |
| EP | 2476597 A1 | 7/2012 |
| EP | 3170714 A1 | 5/2017 |
| JP | 4327055 B2 | 9/2009 |
| KR | 101337014 B1 | 12/2013 |
| WO | 2010096919 A1 | 9/2010 |

* cited by examiner

METHOD AND SYSTEM FOR CONTROLLING THE SPEED OF A VEHICLE

FIELD

The present disclosure relates to a method and system for controlling the speed of a vehicle, and particularly a method and system for regulating the speed of the vehicle relative to a border.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A geofence is a virtual spatial boundary that can limit the travel of a vehicle using global positioning systems to provide accurate and precise determination of the location of the vehicle. Typically, the positions that produce a given set of responses define a contiguous region. The edges of the region become a virtual boundary or geofence. The spatial location of a geofence, that is the limits of region, have commonly been established by selecting a point feature, which may be a point defined by latitude and longitude, and then defining either a radius, or lengths for the major and minor axes through the point, to establish a boundary around the point. Usually the geofence will circumscribe a territory of permitted operational area.

SUMMARY

This section provides a general summary of the disclosure, and is not a comprehensive disclosure of its full scope or all of its features.

According to the present teachings, disclosed is a method of regulating the speed of a vehicle. The method and systems includes defining a first border for a first geographic region, the first border having a first speed within the border and a second speed outside of the border. The method next includes determining a first velocity of the vehicle including a vehicle speed and direction of the vehicle approaching the first border. The difference between the vehicle speed and the second speed is calculated as is a distance between the vehicle and the border. If the difference between the vehicle speed and the second speed divided by the distance is greater than a predetermined value, the vehicle is decelerated at a rate so that the vehicle will have a second speed when the vehicle reaches the border.

According to another teaching the method and systems in the previous and following paragraphs where the second speed is greater than zero.

According to another teaching the method and systems in the previous and following paragraphs where decelerating the vehicle so that the vehicle will have a second speed when the vehicle reaches the border includes reducing an amount of fuel being fed to a vehicle engine.

According to another teaching the method and systems in the previous and following paragraphs where decelerating the vehicle so that the vehicle will have a second speed when the vehicle reaches the border includes applying vehicle brakes.

According to another teaching the method and systems in the previous and following paragraphs where determining a first velocity includes determining a first location of the vehicle at a first time and determining a second location of the vehicle at a second time, and calculating first velocity based on the first and second locations and the first and second times.

According to another teaching the method and systems in the previous and following paragraphs the first and second location is determined using a GPS.

According to another teaching the method and systems in the previous and following paragraphs the first and second times are determined by a GPS.

According to another teaching the method and systems in the previous and following paragraphs the first velocity includes an orientation component and calculating a distance between the vehicle and the border along the direction of the vehicle includes calculating a distance between the vehicle and the border along the orientation component.

According to another teaching the method and systems in the previous and following paragraphs the methods and systems include calculating the location of a second border within the first border, the second border representing a second location perpendicular distance from the first border representing the minimum distance needed to reduce the vehicle's speed from first speed to the second speed at a predetermined deceleration rate.

According to another teaching the method and systems in the previous and following paragraphs the methods and systems include determining the distance of the vehicle from the border for the vehicle traveling at the first velocity.

According to another teaching the method and systems in the previous and following paragraphs where determining the distance of the vehicle from the border is determining the distance of the vehicle from the border when the vehicle is approaching the border at a non-perpendicular angle.

According to the present teachings, disclosed is a method and system for regulating the speed of a vehicle. The method and system include defining a border in a first geographic region, the border having a first speed on a first side of the border and a second speed on a second side of the of the border. The system includes a processor configured to receive a signal and calculate one of a first velocity of the vehicle approaching the first border and a first distance between the vehicle and the border, the processor further configured to calculate a vehicle deceleration rate to reduce the vehicle's speed to the second speed when the vehicle crosses the border. If the vehicle deceleration rate is more than a predetermined value, decelerating the vehicle so that the vehicle will have the second speed when the vehicle reaches the border.

According to another teaching the method and systems in the previous and following paragraphs where the second speed is greater than zero.

According to another teaching the method and systems in the previous and following paragraphs where the vehicle deceleration rate is dv/dt, where the change in velocity is based on time.

According to another teaching the method and systems in the previous and following paragraphs where the vehicle deceleration rate is dv/ds, where dv is change in velocity and (S) is the distance between the vehicle and the border.

According to another teaching the method and systems in the previous and following paragraphs where the vehicle deceleration rate is dv/ds, where s is the distance between the vehicle and the border along the vehicle direction.

According to another teaching the method and systems in the previous and following paragraphs where decelerating the vehicle so that the vehicle will have a second speed when the vehicle reaches the border includes one of reducing an amount of fuel being fed to a vehicle engine and applying vehicle brakes.

According to another teaching the method and systems in the previous and following paragraphs where determining a first velocity includes determining a first location of the vehicle at a first time and determining a second location of the vehicle at a second time, and calculating the velocity based on the first and second locations and the first and second times.

According to another teaching the method and systems in the previous and following paragraphs further includes calculating the location of a second border within the first border, the second border representing a second location perpendicular distance from the first border representing the minimum distance needed to reduce the vehicle speed at a predetermined deceleration rate.

According to another teaching the method and systems in the previous and following paragraphs further includes determining the distance of the vehicle from the border for the vehicle traveling at the first velocity.

According to the present teachings, disclosed is a method of regulating the speed of a vehicle. The method and systems includes an application embodied on a computer-readable medium, the application executable on a computing device and including program instructions that, when executed, are configured to cause the computing device to receive a user first input defining a border in a geographic region and a first speed on a first side of the barrier and a second speed on a second side of the barrier. The application further presents the border on a map to the user via a map display, including display of the first and second speeds. The system includes a processor on a vehicle moving at a third speed in a first direction toward the border. The processor is configured to receive a signal and calculate a distance between the vehicle and the border, and to further calculate the difference between the second speed and the third speed. It is additionally configured to determine if the difference between the second speed and the third speed is more than a predetermined value, and if the difference between the second speed and the third speed is more than a predetermined value, providing a signal which causes the deceleration of the vehicle so that the vehicle will have a second speed when the vehicle reaches the border.

According to another teaching the method and systems in the previous and following paragraphs the processor is configured to determine if the distance between the vehicle and the border is less than a predetermined value, and if the distance between the vehicle and the border is less than a predetermined value, decelerating the vehicle so that the vehicle will have a second speed when the vehicle reaches the border.

According to another teaching the method and systems in the previous and following paragraphs where decelerating the vehicle so that the vehicle will have a second speed when the vehicle reaches the border includes one of reducing an amount of fuel being fed to a vehicle engine and applying vehicle brakes.

According to another teaching the method and systems in the previous and following paragraphs where determining a first velocity includes determining a first location of the vehicle at a first time and determining a second location of the vehicle at a second time, and calculating the velocity based on the first and second locations and the first and second times.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
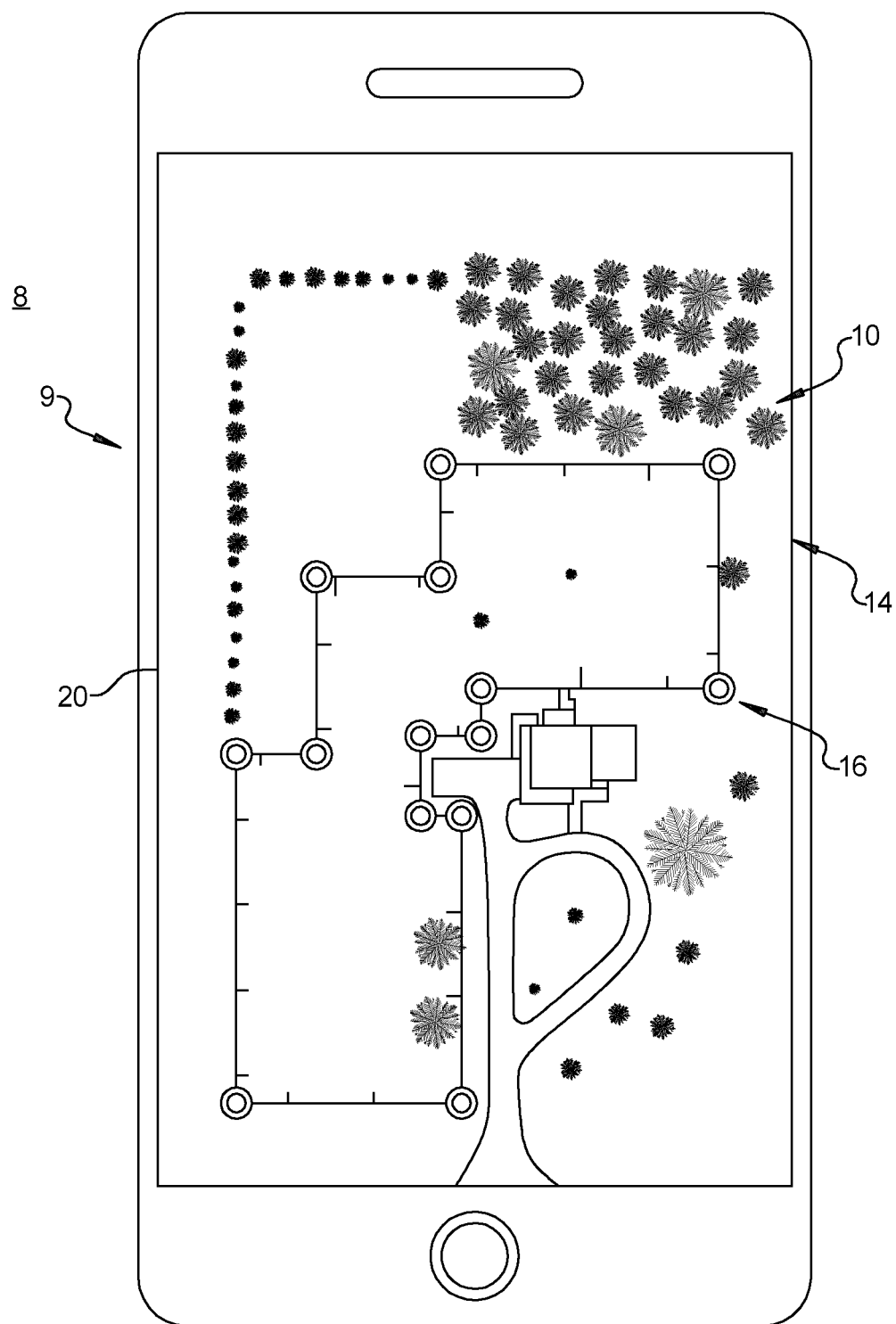
FIG. 1 is a mobile device which defines a geofence used according to the present teachings.

The drawings described herein are for illustrative purposes only of selected embodiments and not all possible implementations, and are not intended to limit the scope of the present disclosure.

FIGS. 1-7 represent a system 8 that regulates the speed of a vehicle within and outside of a bounded area. Further, the system 8 regulates the deceleration of the vehicle as it approaches a border of the bounded area to ensure the vehicle is traveling at a speed no higher than an allowable speed in a given area when the vehicle crosses the border. The system 8 has a computer input device 9, such as an IOS and android device, or a keyboard or mouse, having an application 10 executable on a input device 9 that includes program instructions that, when executed, are configured to receive a user first input 14 defining a boundary or border 16 in a geographic region. The user drops gps or location waypoints 17, onto the input device screen to create a boundary or border 16. The user can define the max allowable top speed on the inside of the boundary and the maximum allowable speed outside of the border 16. The border 16 can be created by connecting as few as three way points 17.

Figure 2:
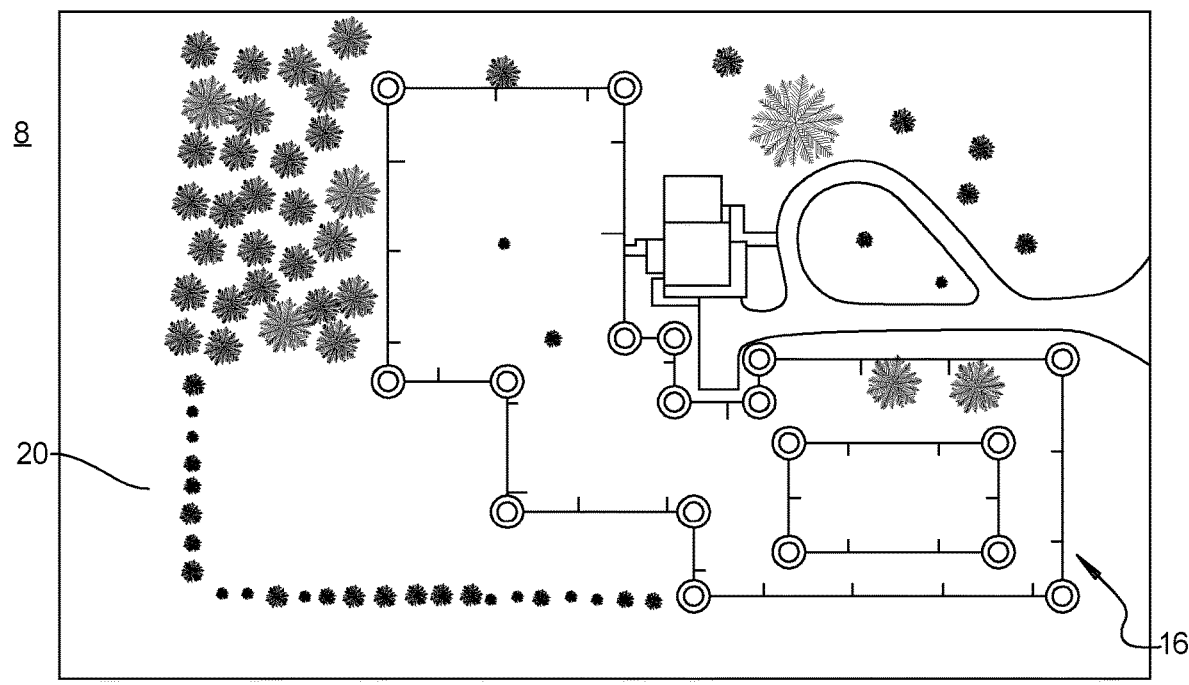
FIGS. 2 and 3 represent geofenced areas according to the present teachings.
Figure 3:
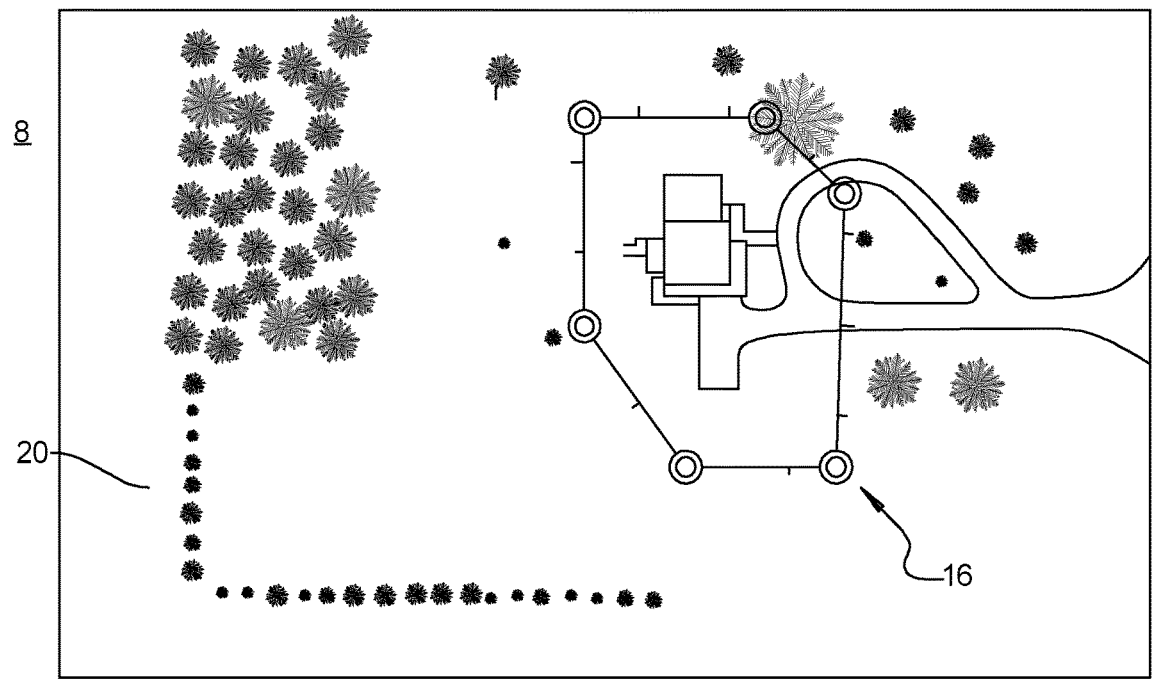
Figure 4A:
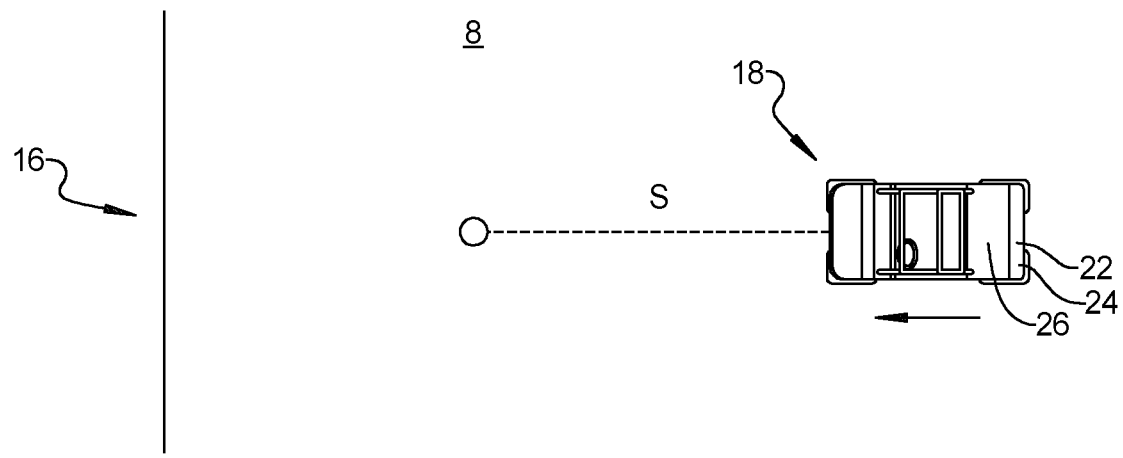
FIGS. 4a-4c represent a vehicle having a system for controlling a vehicle speed approaching a geofenced border.
Figure 4B:
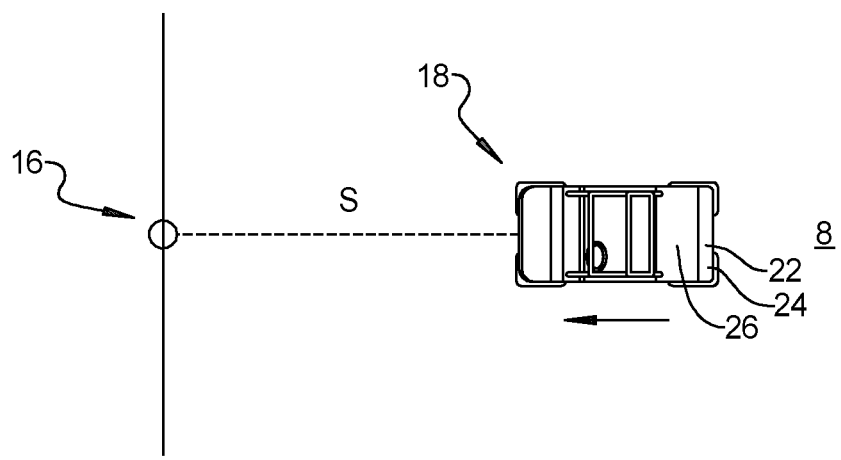
Figure 4C:
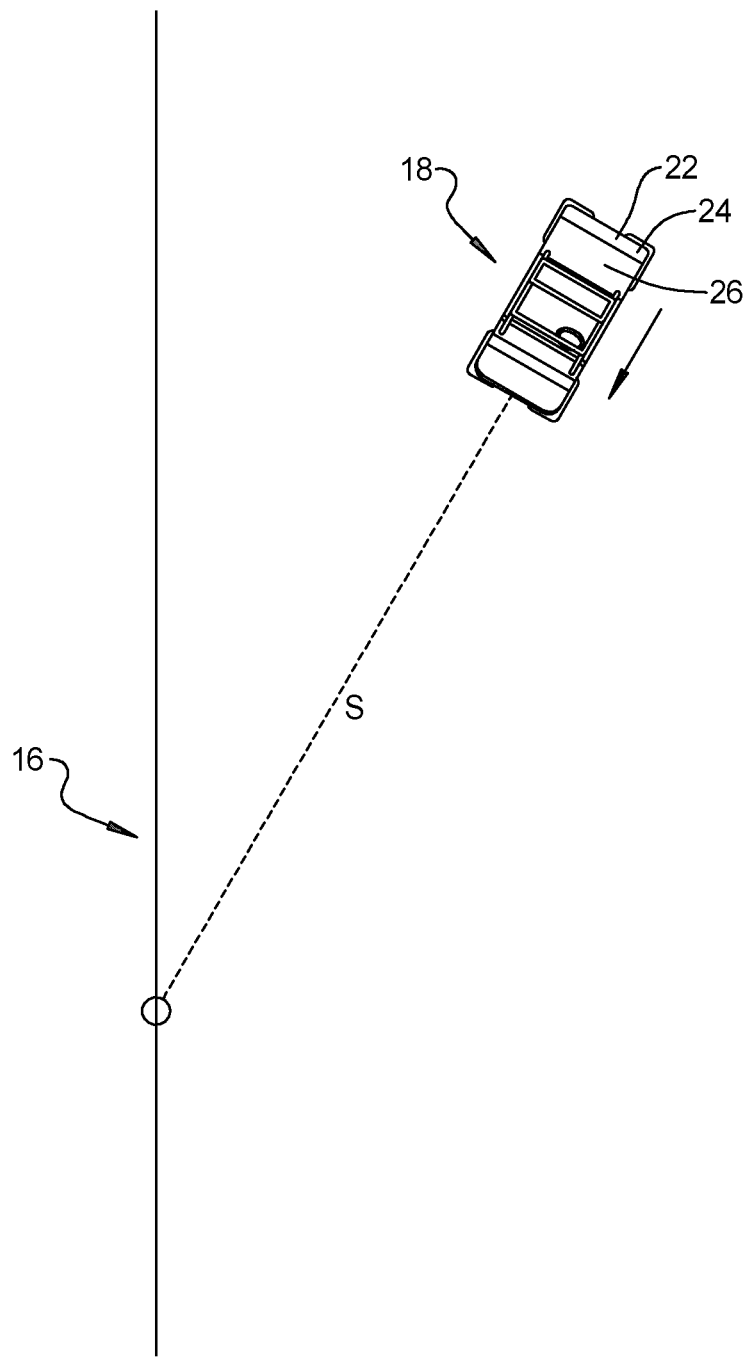

FIGS. 2 and 3 represent variations in defined borders 16 which can be used to limit the speed of a vehicle 18 in different geographic regions. The borders 16 can represent a single line such as a fence line, or can represent a closed polygon. Additionally, they can be used to control a vehicle speed from previously defined physical locations such as trees, ponds, or rocks. Additionally imputable, are a maximum first speed on a first side of the border 16 and a second maximum speed on a second side of the border 16.

Optionally, the maximum speed for the vehicle 18 within the polygon can be either lower, or higher than the speed outside the polygon. The border 16 on a map is presented to the user via a map display 20 on for example a handheld device or on a display on the vehicle 18. Optionally also displayed are the first and second speeds in positions relative to the border 16. As shown in FIG. 2, several borders 16 can be stored. These borders 16 can be separate, overlapping, or one border can enclose another.

The system 8 can include a separate processor 22 which can be part of a vehicle ECU or brake controller, can have a display 24 positioned on the vehicle 18. The processor 22 can receive information from the computing input device 12 regarding the location of the border 16 as well as the relative maximum allowable speeds near the border through a direct wire connection or a wireless connection such as Bluetooth or Wi-Fi. The processor 22 is configured to determine the relative location, speed, and velocity (movement direction) of the vehicle 18 with respect to the border 16. It can do so using inputs from a GPS or an IMU (accelerometer/gyroscope) associated with either the input device 9 or the separate processor 22 and can use a these inputs to calculate a time and a location of the vehicle at regular intervals.

These time and locations can be used in calculating the vehicle's 18 speed, velocity including movement direction, and distance from the border 16. In this regard, the processor 22 can calculate first and second velocities, by determining a first location of the vehicle 18 at a first time and determining a second location of the vehicle at a second time, and calculating the velocity based on the first and second locations and the first and second times. The processor 22 uses a point in polygon algorithm to determine if the vehicle is inside or outside of a boundary area. This information can be used to calculate a perpendicular distance to the border 16 as well as the distance to the border 16 along the path of travel. Generally, the information can be used to control the longitudinal and the lateral speeds, at a rate of ten degrees (lat and long) per second.

When the vehicle 18 moves at a vehicle speed above the speed on the other side of the border 16, in a first direction toward the border 16, the processor 22 is configured to also calculate the distance between the vehicle 18 and the border 16 in the direction of vehicle travel. The processor 22 can calculate how long it's going to take to be 4.5 seconds away from the boundary. Depending on the speed of the vehicle 18, this calculation can occur at either 1 hz or 5 hz intervals. In other words, the if the vehicle is traveling a traveling at a higher speed, the position and velocity calculations need to be conducted at a more frequently to ensure proper determination of the distance to the border 16.

Figure 5:
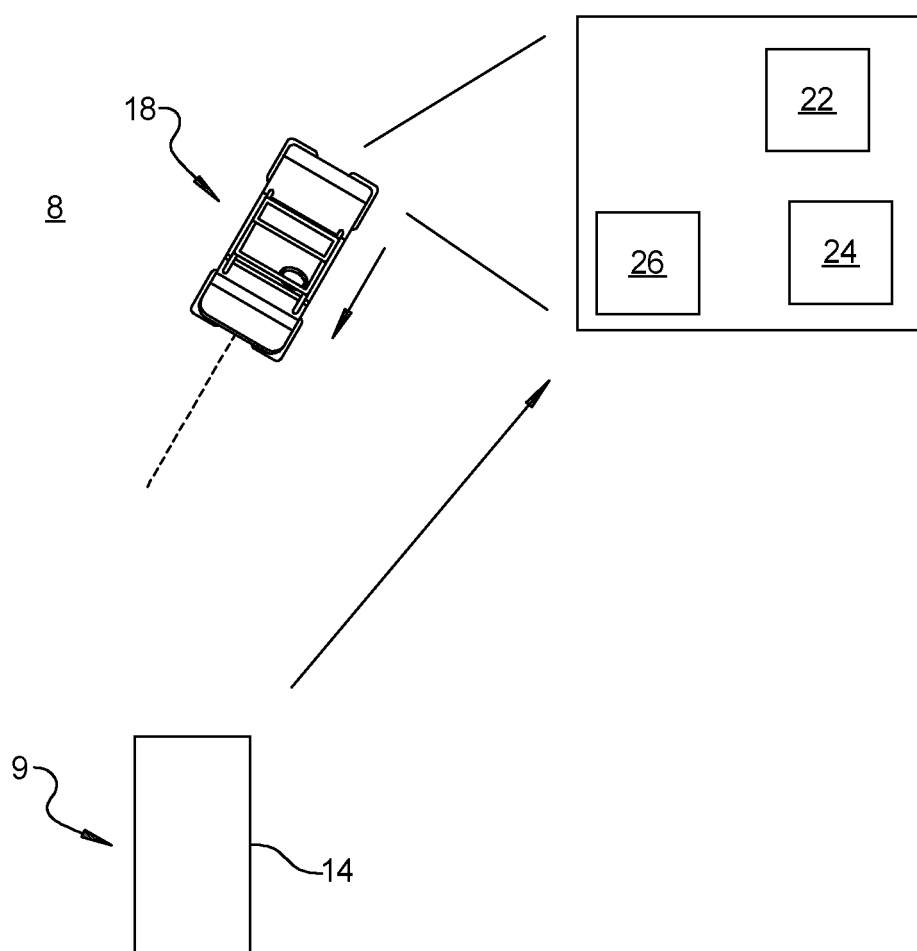
FIG. 5 is a schematic view of the system according to the present teachings.

As shown in FIG. 5, the processor 22 is further configured to calculate the difference between the speed the vehicle 18 is traveling and the maximum speed on the other side of the border 16. If the speed on the other side of the border 16 is lower than the speed the vehicle 18 is traveling, the processor 22 is configured to determine if the difference between the vehicle speed and the maximum speed on the other side of the border is more than a predetermined value.

If the difference between the vehicle speed and the maximum speed on the other side of the border 16 is more than a predetermined value, the processor 22 sends a signal to a vehicle system controller such as an engine or brake controller 26 that alter a vehicle parameter, such as air, fuel, or spark to cause the vehicle 18 to decelerate at a rate so that the vehicle 18 will have a speed that is no more than the maximum allowable speed on the other side of the border when the vehicle 18 reaches the border 16. While at some changes in speed, the engine speeds down fast enough to change the velocity without using the brakes. Optionally, the engine can be disengaged to reduce the velocity via engine braking. The engine controller 26 effects air, fuel and spark, which backs off the power of the engine to spool down a vehicle CVT or regular transmission (not shown).

The processor 22 is further configured to determine the distance (S) between the vehicle 18 and the border 16. If the distance (S) between the vehicle 18 and the border 16 is less than a predetermined value, the processor 22 sends a signal to the engine controller 26 that causes the vehicle 18 to decelerate at a rate so that the vehicle 18 will have a speed that is no more than the maximum allowable speed on the other side of the border, when the vehicle 18 reaches the border 16. In this regard, the vehicle 18 is decelerated so that the vehicle 18 will have the maximum allowable speed when the vehicle reaches the border. It should be understood the maximum speed can be zero to prevent movement of the vehicle (inside or outside) of the border 16, or greater than zero to increase safety.

If the difference between the vehicle speed and the maximum speed on the other side of the border divided by the distance (S) is greater than a predetermined value, the engine or brake controller 26 decelerates the vehicle 18 at a rate so that the vehicle 18 will have a speed no greater than the maximum speed when the vehicle 18 reaches the border 16. If the vehicle speed is not above the predetermined value, the vehicle 16 is allowed to have a speed not greater than the vehicle maximum speed in the region the vehicle is in.

Returning to FIGS. 4a-4c, which represent a vehicle having a system for controlling a vehicle speed approaching a geofenced border. The calculated vehicle velocity includes an orientation or vector component. Preferably, the processor 22 calculates the distance between the vehicle 18 and the border 16 along the direction of the vehicle travel (vector component). Under most circumstances, this will be at an angle non-perpendicular to the border 16.

Optionally, the processor 22 calculates the location of a second border 30 within the first border 16. The second border 30 represents a second location perpendicular distance from the first border 16 representing the minimum distance needed to reduce the vehicle's speed from a vehicle maximum speed to the maximum speed on the other side of the border 16 at a predetermined deceleration rate.

Figure 6B:
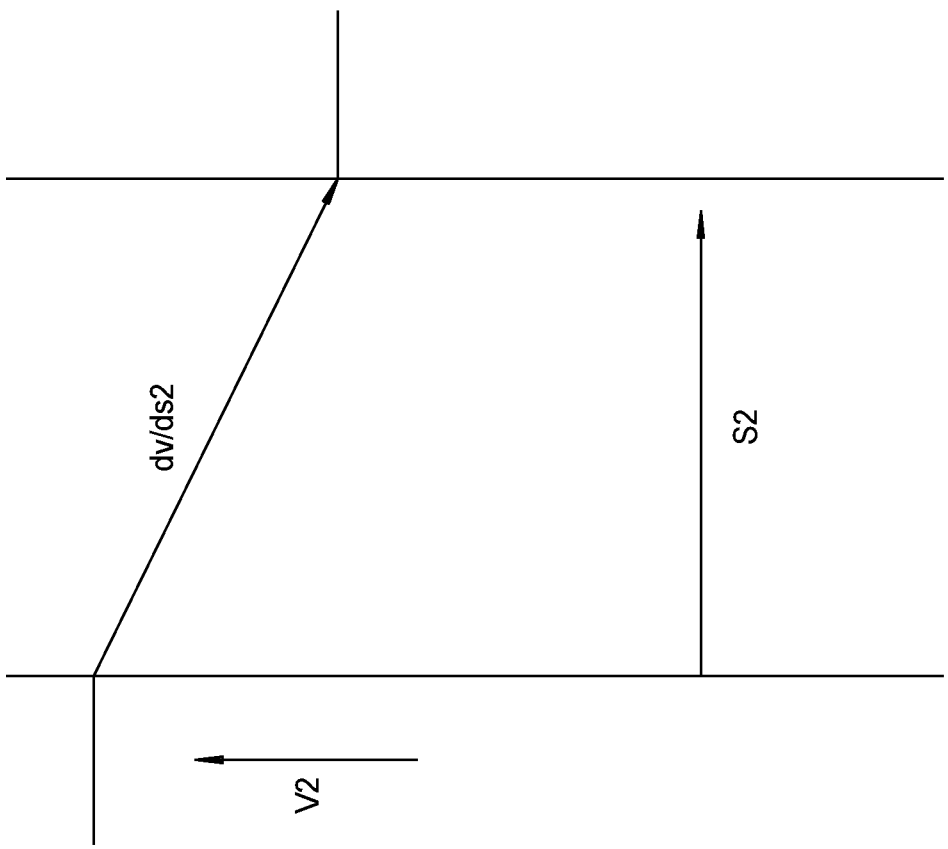
FIGS. 6a and 6b represent changes in speed by distance for various vehicle approaches to a border.
Figure 6A:
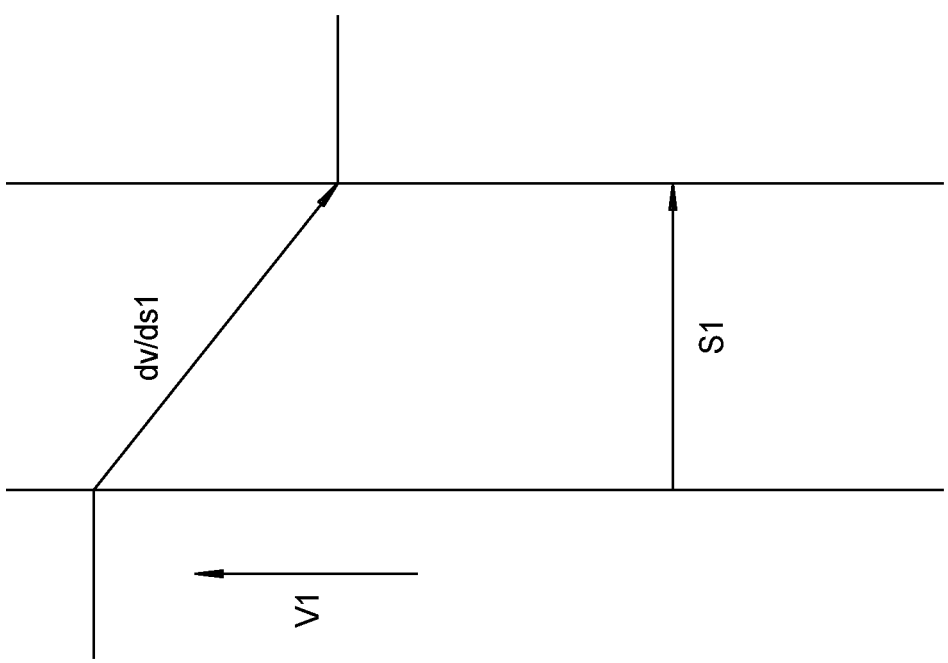

FIGS. 6a and 6b represent changes in speed by distance for various vehicle approaches to a border 18. The vehicle deceleration rate can be calculated as a change in speed over a determined time dv/dt, or preferably can be a change in velocity over distance dv/ds. Optionally, the vehicle 18 deceleration rate is dv/ds, where S is the distance between the vehicle and the border. It is understood that the processor 22 can be calculated in real time combinations of the distance S along the vehicle travel path at particular differences in vehicle speed compared to a formulaic combination of proper deceleration rates.

Figure 7:
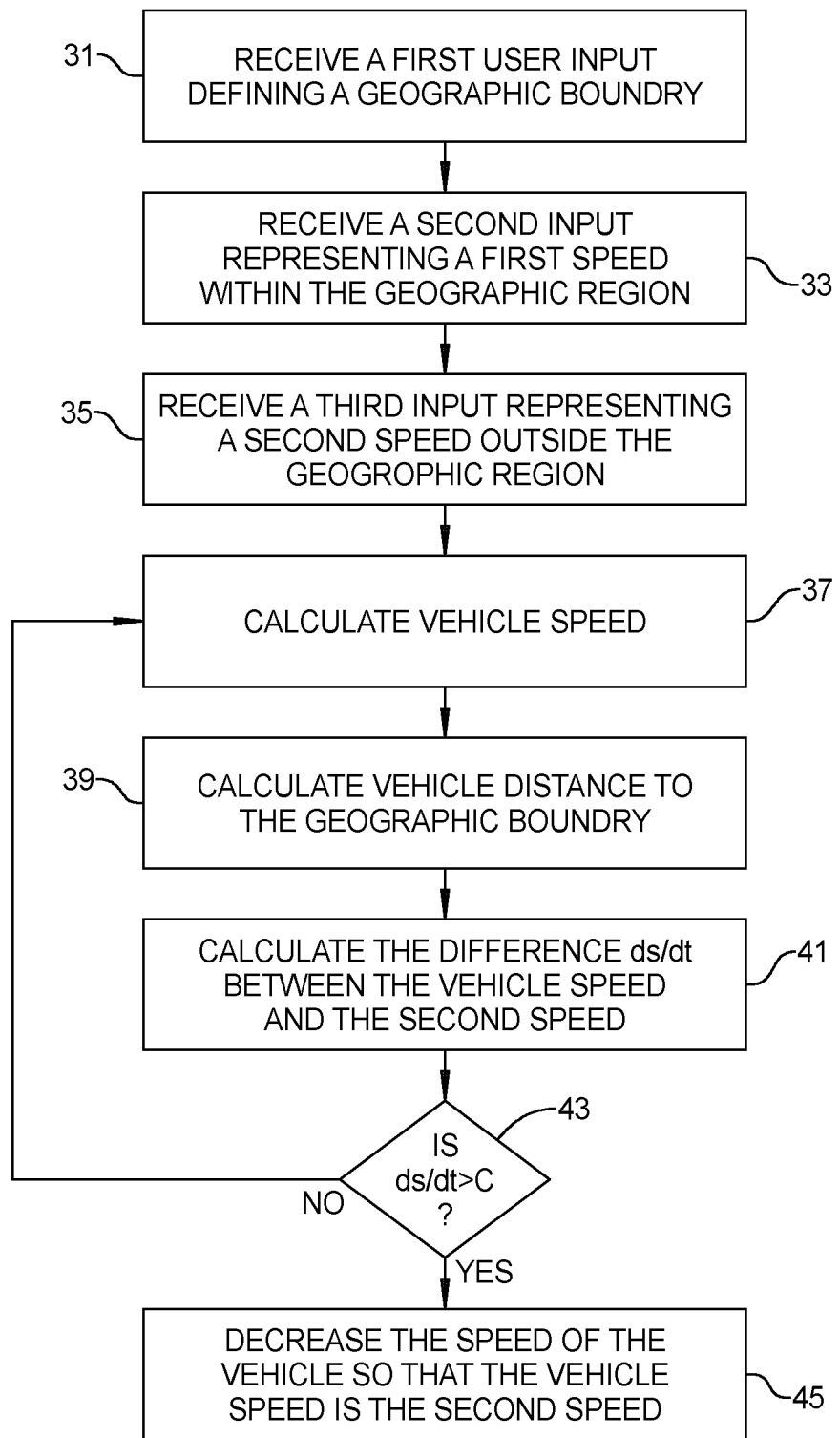
FIG. 7 represents a flow chart for processes in an application according to the present teachings.

FIG. 7 represents a flow chart associated with an application associates with the system embodied on a computer-readable medium. As shown at process steps 31-36, the application is executable on a computing device and including program instructions that, when executed, are configured to cause the computing device to, receive a user first input defining a border in a geographic region and a first speed on a first side of the border and a second speed on a second side of the border. The border is presented on a map to the user via a map display, including display of the first and second speeds.

The system 8 includes a first processor on a vehicle moving at a third speed in a first direction toward the border, the processor at process step 37 is configured to receive a signal and calculate a distance between the vehicle and the border. At process step 38, the first processor further is configured to further calculate the difference between the second speed and the third speed. At query step 39, the processor is configured to determine if the difference between the second speed and the third speed is more than a predetermined value, and if it is at process step 40 decelerating the vehicle so that the vehicle will have the second speed when the vehicle reaches the border. Optionally, the second speed is greater than zero. Optionally, process step 40 can include one of reducing an amount of fuel being fed to a vehicle engine and applying a signal to a vehicle brake. Optionally, the system can further include a second processor configured to provide a signal to control one of fuel flow, an engine air intake, engine spark generation.

Optionally, at process step 38, determining a first velocity includes determining a first location of the vehicle at a first time and determining a second location of the vehicle at a second time, and calculating the velocity based on the first and second locations and the first and second times.

Optionally, these real time combinations can be compared using a look-up table that will provide input to the engine or brake system controller 26 based on differences in speed and distance to the border. Optionally, the system 8 has an input that will allow a user to define different geofenced areas, or areas having different maximum speeds. These optional configurations can be set and unlocked with a locking pin that is entered into the processor 22. Optionally, the system can have parental controls that define parameters such as total hours of use, and hours when the vehicle 16 can be.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The foregoing description of the embodiments has been provided for purposes of illustration and description. It should be noted that the vehicle 16 can be by way of example an ATV, a snowmobile, or a motorcycle. Each of these vehicles having their own preferred mode of operation.

It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of regulating the speed of a vehicle relative to a definition of a border within a first geographic region defined by one or more geographic points:
   executing instructions with a processor to:
   a) access the definition of the border within the first geographic region, wherein within the border a first speed is allowed and a second speed is allowed outside of the border;
   b) determine a first velocity of the vehicle including a first vehicle speed and a first vehicle direction;
   c) calculate the difference between the first vehicle speed and the second speed;
   d) determine a distance between the vehicle and the border; and
   e) when the difference between the first vehicle speed and the second speed divided by the determined distance is greater than a predetermined value transmit a declaration signal to decelerate the vehicle at a deceleration rate so that the vehicle will have the second speed when the vehicle reaches the border.

2. The method according to claim 1 wherein the second speed is greater than zero.

3. The method according to claim 1 wherein the deceleration signal includes a signal to a vehicle controller to reduce an amount of fuel delivered to a vehicle engine of the vehicle.

4. The method according to claim 1 the deceleration signal includes transmitting a signal to a brake controller of the vehicle to apply a brake of the vehicle.

5. The method according to claim 1 wherein determining a first velocity includes determining a first location of the vehicle at a first time and determining a second location of the vehicle at a second time, and calculating first velocity based on the first and second locations and the first and second times.

6. The method according to claim 5, wherein the first and second location are determined using a GPS associated with the vehicle.

7. The method according to claim 5, wherein the first and second times are determined by a GPS associated with the vehicle.

8. The method according to claim 5, wherein the first velocity includes an orientation component and calculating a distance between the vehicle and the border along the vehicle direction and includes calculating a distance between the vehicle and the border along the orientation component.

9. The method according to claim 1, further comprising calculating a location of a second border within the first border, the second border representing a second location that is a distance along a line perpendicular to the first border representing a minimum distance needed to reduce the first vehicle speed to the second speed at a predetermined deceleration rate.

10. The method according to claim 1 comprising determining the distance of the vehicle from the border for the vehicle traveling at the first velocity;
    wherein the border includes a closed polygon.

11. The method according to claim 9, wherein determining the distance of the vehicle from the border is determining the distance of the vehicle from the border when the vehicle is approaching the border at a non-perpendicular angle.

12. The method of claim 1, further comprising:
    inputting at least one geographic waypoint to define the border with an input device; and
    executing further instructions with the processor to create the border.

13. A system of regulating the speed of a vehicle relative to a border:
    a) an input device configured to (i) allow the border to be defined within a first geographic region with an input of at least one geographic way point and (ii) input a first speed on a first side of the border and a second speed on a second side of the of the border;
    b) a processor in proximity to the vehicle when the vehicle is traveling, wherein the processor is configured to calculate one of a first velocity of the vehicle approaching the border and a first distance between the vehicle and the border and to calculate a vehicle deceleration rate to reduce a vehicle speed to the second speed when the vehicle crosses the border; and
    c) when the processor determines vehicle deceleration rate is more than a predetermined value, the processor transmits a signal to a selected controller of the vehicle that causes the vehicle to decelerate so that the vehicle will have the second speed when the vehicle reaches the border;
    wherein the processor is configured to receive a signal regarding at least one of the vehicle location or the vehicle speed.

14. The system according to claim 13 wherein the second speed is greater than zero.

15. The system according to claim 13 wherein processor determines the vehicle deceleration rate as a change in speed over a determined time at regular intervals.

16. The system according to claim 13 wherein processor determines the vehicle deceleration rate as change in velocity over distance "s", where "s" is the distance between the vehicle and the border.

17. The system according to claim 13 wherein processor determines the vehicle deceleration rate as change in velocity over distance "s", where "s" is the distance between the vehicle and the border along a vehicle direction.

18. The system according to claim 13 wherein processor transmits the signal to a vehicle subsystem to at least one of reduce an amount of fuel being fed to a vehicle engine or apply a vehicle brake.

19. The system according to claim 13 wherein a signal regarding at least one of the vehicle location includes a signal of at least a first and second location from a GPS.

20. The system according to claim 13 wherein the processor calculates the location of a second border within the first border, the second border being a distance along a line perpendicular from the first border representing the minimum distance needed to reduce the vehicle speed at a predetermined deceleration rate.

* * * * *